June 18, 1940.   R. W. STROUT   2,204,710
CONTROL MEANS FOR FLUID-OPERATED CLUTCHES
Filed May 26, 1937   3 Sheets-Sheet 1
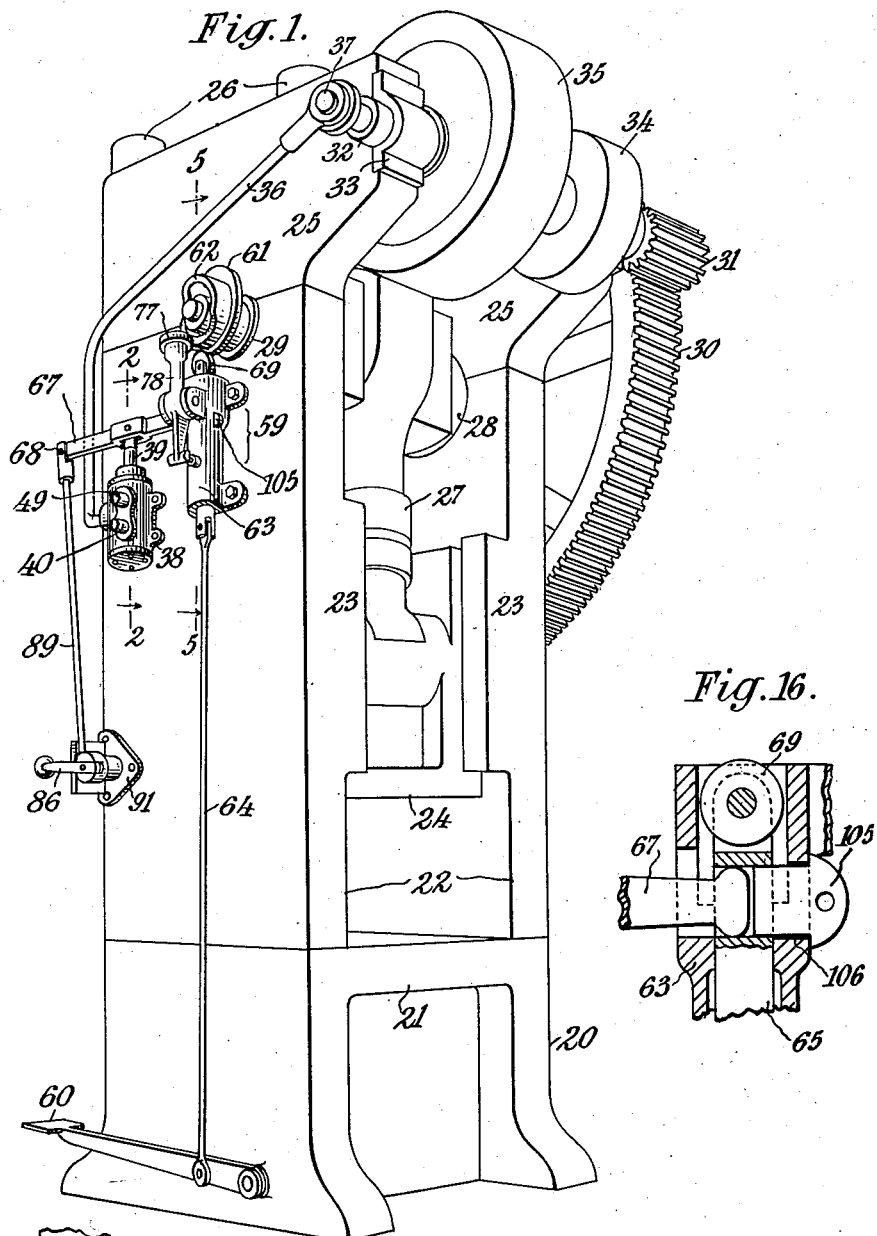
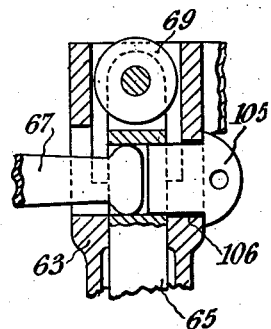
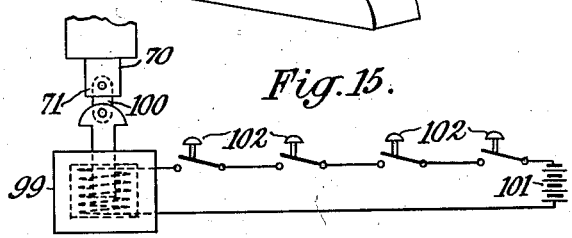
INVENTOR
Robert W. Strout
BY
ATTORNEYS.

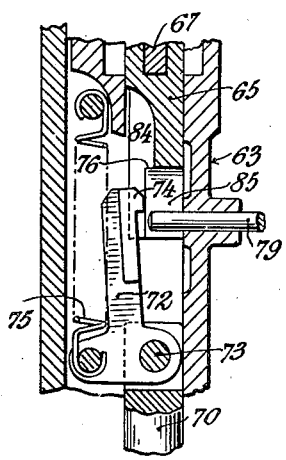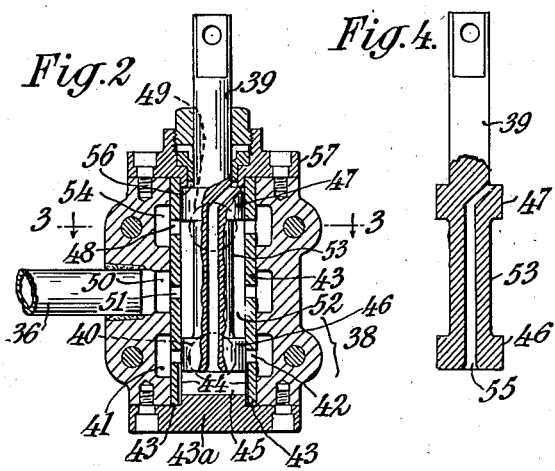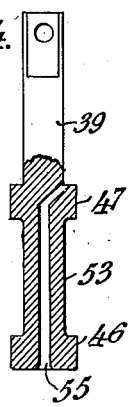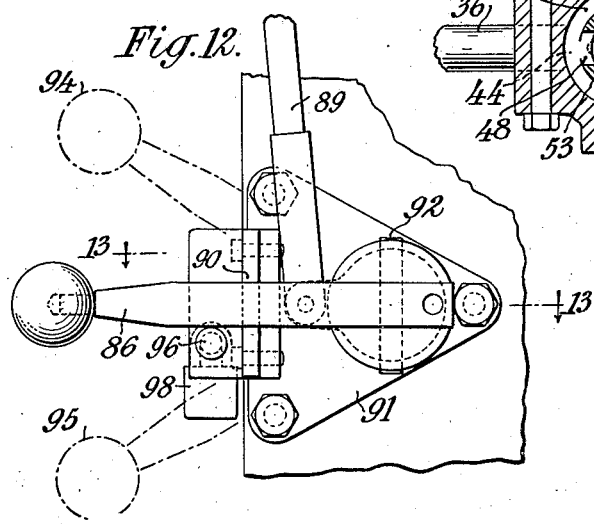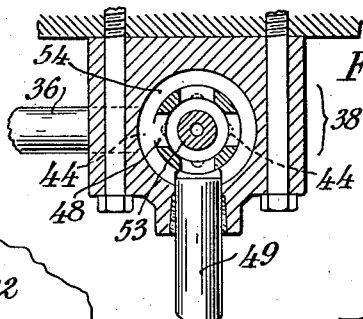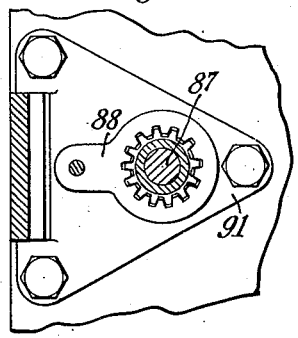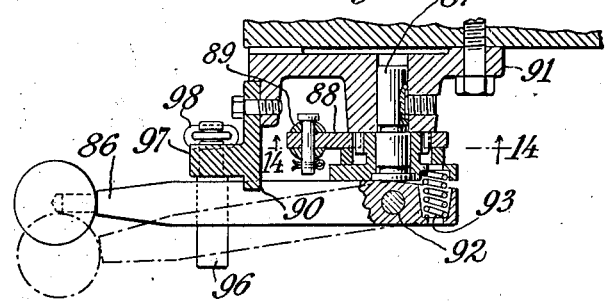

June 18, 1940.　　　　R. W. STROUT　　　　2,204,710
CONTROL MEANS FOR FLUID-OPERATED CLUTCHES
Filed May 26, 1937　　　3 Sheets-Sheet 3
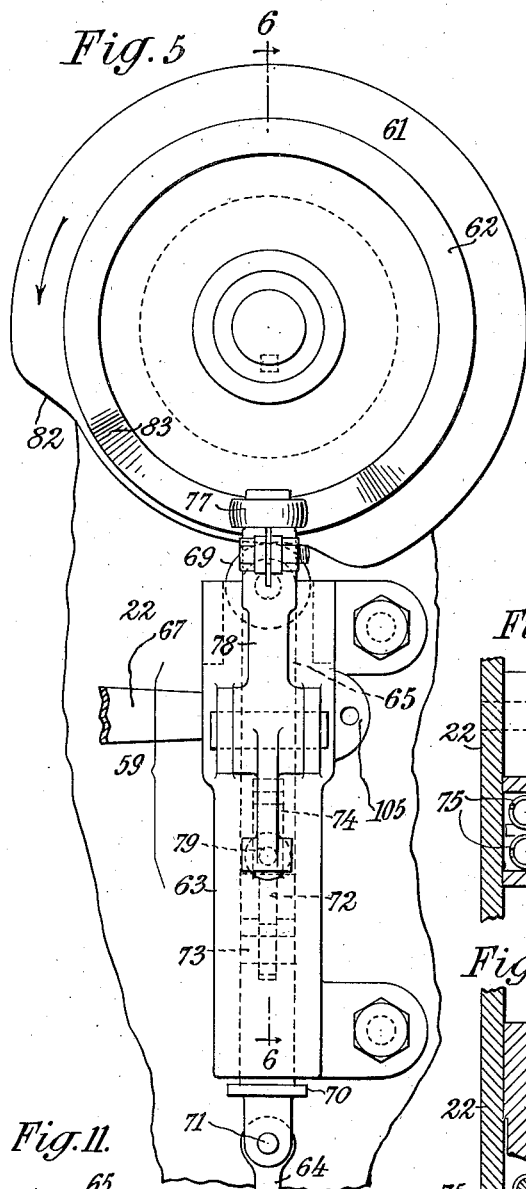
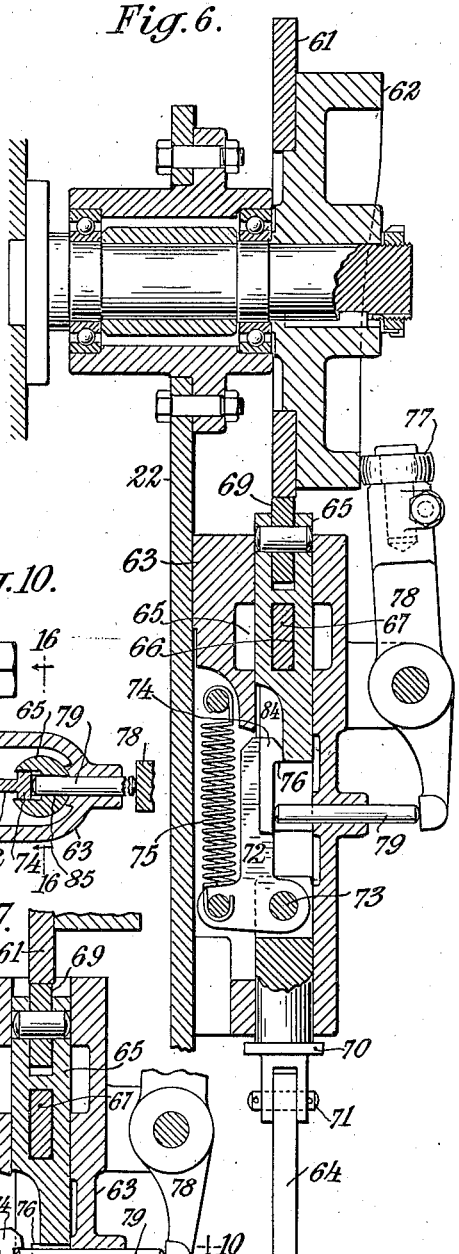
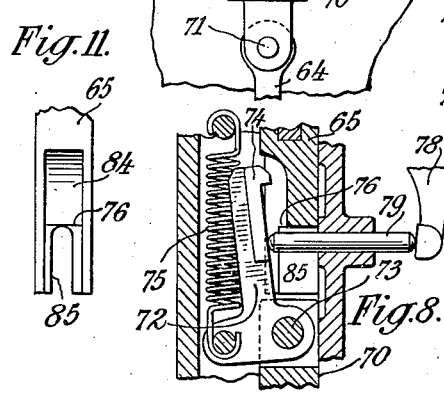
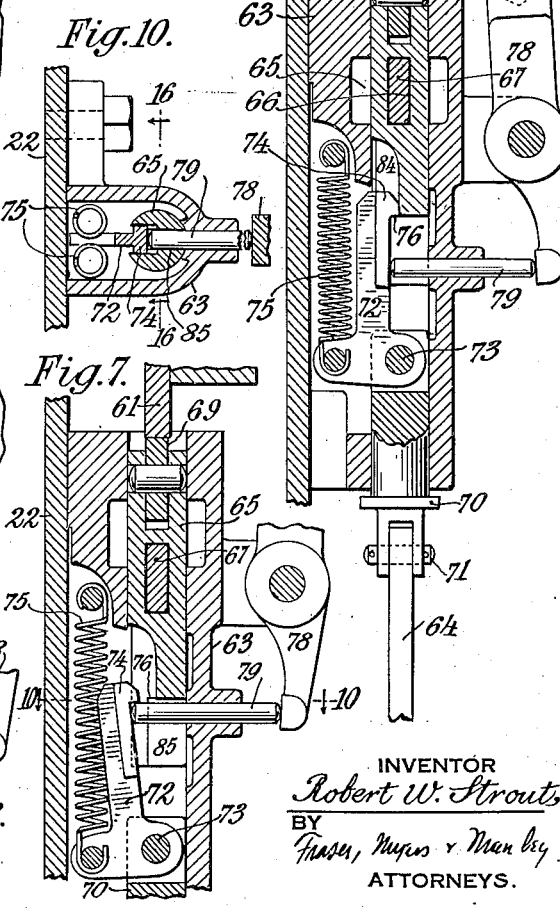
INVENTOR
Robert W. Strout
BY
Fraser, Myers & Manley
ATTORNEYS.

Patented June 18, 1940

2,204,710

UNITED STATES PATENT OFFICE 2,204,710

CONTROL MEANS FOR FLUID-OPERATED CLUTCHES

Robert W. Strout, Brooklyn, N. Y., assignor to E. W. Bliss Company, Brooklyn, N. Y., a corporation of Delaware Application May 26, 1937, Serial No. 144,767

13 Claims. (Cl. 192—85)

This invention relates to the control of a driven shaft having a friction clutch connecting it to a power shaft, and a brake element normally biased so as to engage the driven shaft and prevent rotation thereof; and in its more particular aspects, to improvements in apparatus for controlling a power driven press having its driven counter-shaft equipped with such friction clutch and braking devices and with fluid pressure actuated mechanism for engaging and disengaging both the clutch and brake in timed relation with each other and with the die-carrying elements of the press.

The principal object of the present invention is to provide for the starting of a press having fluid-actuated clutch and braking devices, by a manual operation of the press attendant; and for stopping it after its die-carrying elements have completed a prescribed cycle of operation. More specifically, it is the object of the invention to provide a valve element adapted to admit fluid under pressure to the clutch and brake-actuating means in response to a manual movement of a controlling lever so as to start the press; and with means carried by the die-actuating crank, or comparable element, adapted to actuate the valve in such fashion as to release the fluid pressure on the clutch and brake means, and cause a stoppage of the press when its elements have returned to an initial position.

It is a further object of the invention, in addition to the foregoing, to provide for the starting of such a press only upon the concurrent agreement of several press attendants, that is, a control in which each such attendant must participate before the press can be started.

A further object of the invention is to provide for a starting or stopping of the press entirely responsive to the manual control of an attendant, so that the die slides may be "inched" towards or away from each other and the die elements carried thereby be properly adjusted.

Another object of the invention is to provide for an emergency stopping of the press at any and all times whereby an alert attendant may avert damage to an improperly placed piece of material; or more important, to prevent injury to himself or another attendant.

The full nature of the invention and further objects and features thereof will be more fully understood from a consideration of the following description when read in connection with the accompanying drawings, in which:

Figure 1 is a perspective view of a power driven press having a friction clutch and braking means actuated in response to the admission thereto of fluid under pressure, and means for regulating the admission of such a fluid in accordance with the present invention.

Fig. 2 is a sectional view of the regulating valve of the present invention taken on the line 2—2 of Fig. 1.

Fig. 3 is a sectional view taken on the line 3—3 of Fig. 2.

Fig. 4 is a detail view of the piston element of the valve of Figs. 2 and 3, certain parts thereof being broken away better to show its interior construction.

Fig. 5 is an elevational view of a part of the valve-actuating means shown in Fig. 1 looking in the direction indicated by the arrows 5—5 of the latter figure, and illustrating the position of the operating cams when the press is stopped.

Fig. 6 is a sectional view taken on the line 6—6 of Fig. 5.

Figs. 7, 8 and 9, are sectional views of the safety latch and automatic cut-off elements of Fig. 6, showing the position of the various parts thereof when the press is in operation, and particularly illustrating the automatic release of the treadle, or valve tripping, mechanism.

Fig. 10 is sectional view taken on the line 10—10 of Fig. 7.

Fig. 11 is a detail view of a portion of the operating plunger of Figs. 6, 7, etc.

Fig. 12 is an elevational view of the hand control lever for the regulating valve of Fig. 1, and of a fragment of the side element of the press to which it is attached.

Fig. 13 is a sectional view taken on the line 13—13 of Fig. 12.

Fig. 14 is a sectional view taken on the line 14—14 of Fig. 13.

Fig. 15 is a diagrammatic view illustrating a circuit arrangement, including two or more switch elements arranged in series so that each must be closed before the circuit can be completed to start the press.

Fig. 16 is a sectional view taken on the line 16—16 of Fig. 10.

The control apparatus of the present invention may be embodied in any machine having a driven shaft provided with a friction clutch for transmitting power from a driving element to the shaft, and an adjacently located friction brake for resisting the movement of such shaft, in which both the clutch and the brake are normally biased, by a spring element for example, in such fashion that the brake engages the shaft and holds it against rotation while the clutch is disengaged; and further provided with fluid pressure-actuated means for overcoming such spring bias and engaging the friction plates of the clutch while simultaneously disengaging those of the brake. For purposes of description, the invention will be considered in connection with a power driven press such as the one illustrated in Fig. 1, comprising a bed 20 having a table 21 for supporting a lower die element (not shown), a pair of spaced side plates 22 mounted upon the bed and having guideways 23 for the vertically movable die slide 24, and a crown 25 mounted on, and joining, the upper ends of the side plates. All of the frame elements are connected together and held in assembled relationship in any desired way, as, for example, by means of the tie rods 26. Reciprocation of the die slide, in the present instance, is obtained through a pitman 27 from the crank arm of shaft 28, the latter being journaled, as at 29, in the upper parts of the side plates, and geared, as at 30 and 31, to a driven countershaft 32 carried in bearings 33 on the overhanging portions of the crown plates 25.

The counter-shaft is provided with a brake drum 34 having friction plates adapted to hold the shaft against rotation, and with an adjacently disposed clutch drum containing similar plates for engaging and disengaging the shaft with a driving shaft (not shown). Preferably these two units are spring-biased in such fashion that the brake normally engages the shaft, and the clutch is normally disengaged; and are provided with fluid-actuated means adapted, upon the admission of fluid thereto through supply pipe 36, to overcome the spring bias and engage the clutch with its driving element while simultaneously disengaging the brake element to permit rotation of the counter-shaft. Such a clutch and brake arrangement is illustrated in the patent to Rode et al., No. 2,909,301 but any other comparable one may be used.

With an arrangement of this kind, control of the operation of the press may be obtained by regulating the flow of liquid to the clutch and brake-actuating means. For this purpose, and as a part of the present invention, the press is provided with a three-way valve 38 having a casing provided with inlet, supply and discharge ports connecting respectively with a source of fluid under pressure, the clutch-actuating means, and a reservoir; and cooperating valve means for selectively placing the supply opening in communication with either the inlet or discharge ones. Preferably, the valve means is normally biased to such position as to hold the press inoperative—in the illustrated case, to hold the supply opening in communication with the discharge one and thus permit the clutch to be disengaged by its biasing means—and is moved to the other position by a hand, foot or automatically operated lever, against that bias to start the press, all as will later be brought out.

The constructional details of a valve 38 embodying these features are illustrated in Figs. 2, 3 and 4. There it may be seen that the piston element 39 is always biased in its upper position by the admission of fluid through the valve inlet 40, annular inlet passage 41, inlet valve openings 42 in the cylindrical liner 43, and the axial leak passages, or grooves, 44, in this liner leading to the chamber 45 formed between the lower face of the piston and the lower cap 43a of the valve casing so as to subject the lower head 46 thereof to an unbalanced pressure. In this position the lower head 46 covers the arcuately spaced inlet valve ports 42, while its upper head 47 uncovers the similarly arranged discharge ports 48 and establishes communication between the supply pipe 36, (leading from the clutch-actuating valve), and the outlet pipe 49 means to the valve), and the outlet pipe 49 through the annular supply passage 50, arcuately spaced supply ports 51, the chamber 52 formed between the sleeve and the reduced portion 53 of the piston, the discharge ports 48, and annular discharge passage 54. The valve is thus normally biased to an "off" position, that is, one relieving the clutch-actuating means from fluid pressure, and permitting the spring-biasing elements thereof to disengage the friction plate of the clutch and engage those of the brake to prevent rotation of the countershaft 32.

When the valve 39 is depressed against the unbalanced fluid pressure (the liquid in the lower chamber 45 being displaced through the axial passage 55 in the piston to the upper chamber 56 formed between the upper head 47 and the upper valve cap 57), the upper head will close the discharge valve ports 48, and the lower head 46 will uncover the supply valve ports 42. When the valve ports are so disposed, the inlet passage 40 (shown in dotted lines) will be placed in communication with the supply pipe 36, thus admitting fluid to the clutch-actuating mechanism so as to overcome the spring bias thereof and engage the clutch while simultaneously releasing the brake. As soon, however, as the piston is released, the unbalanced pressure on its lower face will immediately return it to the upper or "off" position illustrated in Fig. 2, thus releasing the pressure on the clutch-actuating means and stopping the press in the manner above-mentioned.

The control mechanism for a power press of the type herein generally described should be so arranged that when the press has been started by an attendant, it will normally continue in operation for one complete cycle, that is, until its die slide 24 has descended to engage a piece of work, and has retreated to its upper position. Further, it should include a safety latch, or comparable device, which will prevent a repetition of its operating cycle. For this purpose then, the press is provided with a latch bracket 59 having operative connections with the treadle 60 and with the cams 61 and 62. The detailed construction of these parts is illustrated in Figs. 5 to 10, inclusive, wherein it may be seen to comprise a casing 63, rigidly attached to the side plate 22 of the press, and a vertically reciprocable plunger 65, having a lateral slot 66 therein engaging the free end of a valve-operating lever 67, the latter being pivoted for normal movement about the connecting pin 68. Accordingly, when the treadle 60 is depressed, the plunger 65 and valve lever 67 will be drawn downwardly (through the tie rod 64 and other elements later to be considered), so as to move the valve piston to its open position and thus subject the clutch-actuating means to fluid pressure. Immediately, of course, the brake will be released and the clutch engaged to start the rotation of the crank shaft 28.

In order to continue the operation for a definite length of time, the crank shaft carries a cam 61 adapted to engage the roller 69 mounted in the upper end of the plunger 65, after the press has been started, and to hold this plunger, and the valve-operating lever 67, down, until the die slide has descended and retreated almost to its top dead center position. At that time the cam 61 releases the plunger 65, the lever 67, and the valve piston 39; and the latter element immediately returns to its closed or "off" position under the influence of the unbalanced pressure on its lower head, thus stopping the operation of the press.

In order to prevent an attendant from defeating the safety feature above described, i. e., a stopping of the press at the end of each operating cycle, by holding the valve open at all times, the invention provides an additional safeguard comprising a safety latch interposed between the treadle-actuated tie rod 64 and the valve operating plunger 65; and an automatic cut-out adapted to disengage the latch as soon as the press is started, and to reengage it only after the press has been brought to a dead stop. The latch, or non-repeat device (Figs. 5–10) comprises a follower 70, pinned at 71 to the tie rod 64, and having a latch 72 pivoted thereto at 73 with its nose 74 pressed to the position shown in Fig. 6 by the tension spring 75 so as to be capable of engaging the shoulders 76 formed on the plunger 65. Obviously, when the parts are so disposed, an attendant may start the press by stepping upon the treadle 60, as hereinbefore described; and Figs. 6 and 7 particularly illustrate the positions of the follower and plunger just before and just after this has been done.

The constructional details of the automatic cut-out, and its mode of operation, are best shown in Figs. 5–9, inclusive. By reference to these figures it will be seen that when the press is started the face cam 62 engages the roller 77, carried on the upper end of pivoted lever 78, and forces pin 79 inwardly to kick the latch 72 (against the tension of springs 75) out of engagement with the shoulders of the plunger. If the attendant now releases the treadle in accordance with good practice and as is usually done, the follower 70, latch 72, etc., will move to the position illustrated in Fig. 8 under the influence of springs 75, but the latch nose 74 will be held out of the path of the shoulders 76, on the plunger, by the pin 79. Accordingly, the operator may step on the treadle as many times as he likes during any one cycle of the die slide without in any way affecting the operation of the controlling valve.

When the crank-shaft again approaches its top dead center position at the end of an operating cycle, and cam 61 releases the plunger 65 and allows it to rise, thus bringing the machine to a stop, all as hereinbefore described, the cam 62 likewise releases the lever 78, thus permitting springs 75, acting upon the latch 72, to force the pin 79 outwardly, and thereby allowing the latch nose to reengage the shoulder 76.

If the attendant has held the treadle down during the cycle of operation of the press, then at the completion thereof the parts will occupy the positions illustrated in Fig. 9, that is, with the latch nose 74 below and out of engagement with the shoulders 76 of the plunger 65. Hence, before the press can again be started, the treadle must be released, and the latch returned to the position of Fig. 6.

The cams 61 and 62 may be so designed as to engage the rollers 69 and 77, of the plunger 65 and lever 78, respectively, to take control of the operation of the machine as soon as the treadle 60 is depressed. If so, then the attendant will be free to prepare the next work-piece for insertion in the press as soon as that particular operating cycle has been completed. Frequently, however, it will be found desirable to require the treadle to be held down for some considerable time before these cams take command. In many instances it is preferable to so design these elements that they take effect only when the slide 24 has descended to such extent as to be almost in engagement with the lower die carried on the table 21, for then, the entire descent of the die slide is under the control of the operating treadle, and will engage the undivided attention of the press attendant. In any event it is desirable that the valve control cam 61 have its cut-off point 82 slightly in advance of the cut-off point 83, of the cut-out cam 62, so that the plunger 65 may begin to rise before the pin 79 has withdrawn to permit re-engagement of the latch nose with the plunger.

The constructional details of the lower part of the plunger 65, and of the latch 72 are best illustrated in Figs. 7, 10 and 11. Here it may be seen that the rear face of the plunger is undercut to form a recess 84 adapted to accommodate the latch nose 74, the latter extending substantially the full width of this recessed portion, and to provide the shoulders 76; and the lower end of the plunger is slotted at 85 to accommodate the pin 79.

The normal operation of the press is obtained through the use of the treadle 60, and of the cams 61 and 62. Once it has been started by depression of the treadle, the cams take control of the operating valve and continue movement of the slide for one complete cycle. In any industrial machine such as this, the control mechanism thereof must include safety devices for stopping the machine during any part of the operating cycle, that is, whenever an emergency arises. The present invention provides such an emergency stop, comprising a hand lever 86, pivoted for movement in a vertical plane about the pin 87, and connecting through the link 88 and tie rod 89 with the left hand end of the valve operating lever 67, at 68. This hand lever is normally held in the position shown in Fig. 1 (and in the full line positions of Figs. 12 and 13), so that the pin 68 may constitute a fulcrum about which the valve-operating lever 67 may pivot to start and stop the press. Assuming that the press has been placed in operation in the manner above described, and accordingly that the right hand end of the lever is being held down by the action of the cam 61 on the plunger 65, it is evident that if the left hand end of the valve-operating lever 67 is released, then the valve piston 39 will rise under the influence of the unbalanced pressure against its lower face to relieve the fluid pressure on the clutch-operating mechanism and bring the press to a stop. This may be accomplished by moving the hand lever about its vertical pivot 92 against the tension of spring 93 to the dotted line position of Fig. 13, so as to clear the shoulder 90; and as soon as this is done, of course, the handle, the tie rod and the left hand end of the valve lever 67, are perfectly free to rise under the influence of the unbalanced pressure constantly exerted against the valve piston so as to bring the press to a stop.

The hand lever 86 may also be used for "inching" the die slide downwardly and upwardly in very small steps during the setting and adjusting of the dies (not shown) carried on the lower end of the die slide and on the table 21. This is done by moving the handle from the full line position of Figs. 1 and 12 downwardly to the dotted position indicated at 95 so as to open the valve, thereby starting the press, and immediately releasing the lever so that the press will be stopped almost as soon as it is started. By a continual repetition of this action the die may be inched downwardly until the position of the crank-shaft is such that the cam 61 takes control of the valve lever to hold it in an "on" position. Thereafter, for the remainder of the operating cycle, "inching" may be obtained by moving the handle 87 between the upper dotted line position 94 of Fig. 12 and the full line position of that figure. Accordingly, the die slide 24 may be "inched" throughout an entire operating cycle so that its dies may be examined and adjusted, as required.

The adjustment of the dies is, of course, made by a skilled mechanic, not by the ordinary press attendant. In order to prevent the attendant from using the handle 86, as anything other than an emergency stopping means, the hand lever bracket 91 is provided with a pin 96, passing through an opening in the angle portion 97 thereof, and positioned at such point as to prevent a depression of the hand lever below the full line position of Fig. 11. Ordinarily, this pin is held in position by a padlock 98; and the key thereto is retained by the master mechanic. Under this condition, the attendant may do nothing other than kick the lever 86 laterally so as to release it from the latch 90 and bring the press to a halt, but he may not use it as an ordinary starting and stopping mechanism.

Frequently, power presses of the general type illustrated in Fig. 1 are very massive structures requiring two or more attendants to feed material thereto, remove finished parts therefrom, and generally to operate it. In such instance it is highly desirable to provide a control mechanism in which each such attendant must participate before the machine can be placed in operation. In other words, it is undesirable to have the machine under the sole control of one attendant, for he may start the press before his co-attendant has gotten out of the way of the die slide, etc. A dual, or multiple control of this general type, adapted to be substituted for the foot-operated treadle 60 and tie rod 64 of Figs. 1 and 6, is shown diagramatically in Fig. 15. By reference to that figure it may be seen to comprise a solenoid 99 connected, through link 100, with the follower element 70 of the safety latch; and an electrical circuit, including the battery 101, and two or more hand switches 102, all in series relation with the battery and with the solenoid. With this arrangement each of these various hand switches must be depressed, and held in depressed position, before the solenoid will be energized to pull the latch follower downwardly and start the press in the manner hereinbefore generally set forth; and once the press is so started, the automatic cut-off will kick the latch 72 out of the path of the plunger 65 in the manner and for the purpose hereinbefore set forth.

As additional safety precautions it will usually be found desirable to provide a pair of switches 102 for each press attendant, and to separate the switches constituting each pair to such extent as to require the use of both hands of the adjacent attendant; and to design the cams 61 and 62 so that they are capable of assuming command of the press operation only after the die-slide has descended to such point that it is, or is almost, engaging the work-piece—all for the purpose of occupying both hands of each attendant until such time as he can no longer place them in a dangerous position, namely, under the descending die-slide.

While the electrical control such as the one shown in Fig. 15 has certain advantages, it is perfectly evident that similar results can be obtained by the use of a number of hand valves controlling, in series, the flow of a fluid under pressure through a conduit to an hydraulic cylinder substituted in place of the solenoid.

In many instances the press of the type herein described has an automatic work-feeding mechanism associated therewith; or its die-slide operates so slowly that an attendant may feed and remove work-pieces by hand without grave danger of injury. Under such circumstances, it is desirable that the press be operated continuously, without any interruption at the end of each cycle. Such operation may be had with the present press control through the intermediary of the hand lever 86 in the manner now to be described: Assuming that the press is stopped and its various parts occupy the position shown in Fig. 1, then the hand lever will first be moved to the upper position 94 of Fig. 12. In such case the lever 67 will merely pivot about its connection to the valve plunger 39 (without affecting that part), and will consequently force the safety latch plunger 65 downwardly to the position shown in Fig. 7. At this point a gag 105, comprising nothing more than a pin or the like, will be inserted through the opening 106 in the side of the latch casing 63 (see Figs. 1 and 16) so as to hold the plunger 65 in that position. Thereafter the lever 67 will be pivoted at its point of engagement with the plunger, that is, at the opening 66 therein. Accordingly, if the hand lever 86 be now depressed from the dotted line position 94 of Fig. 12 to the full line position thereof, the valve plunger 39 will be depressed, permitting the flow of fluid to the clutch and brake-actuated means and starting the press in the manner hereinbefore described. Obviously if under these conditions the lever 86 is engaged under the ledge 90 so as to be held in the full line position of Fig. 12, then the valve plunger 39 will be held downwardly at all times to permit continuous operation of the press. If, however, the lever be kicked from under the ledge, as hereinbefore described, the valve plunger 39 will immediately move to its "off" position under the influence of the unbalanced pressure on its lower head, thereby causing a stopping of the press.

Since certain changes may be made in the construction of the machine and in the adaptation of the invention, all within the skill of the ordinary mechanic, it is intended that the foregoing shall be construed in a descriptive rather than in a limiting sense.

What I claim is:

1. Control means for a power driven machine having a driving shaft, a driven shaft, a clutch for transmitting power between such shafts, such clutch being normally biased to a released position, and fluid pressure actuated means for engaging said clutch against its bias, said control means comprising, in combination: a valve for regulating the flow of fluid to and from such actuated means including a casing having inlet, supply, anid discharge ports connecting respectively with a source of fluid under pressure, the clutch actuating means, and an exhaust, a piston slidably disposed in said casing and adapted to be moved to such positions as to connect the supply ports either with said inlet or said discharge ones, and a passage leading from the inlet ports to a chamber formed between an end wall of the casing and an adjacent head of the piston whereby to subject the latter to an unbalanced pressure and normally bias it to a position connecting the supply and discharge ports; a valve operating lever having a fulcrum and pivotal connection with the piston; first operating means having connection with said lever for swinging the latter about its fulcrum to move the piston against its bias to connect said supply with said inlet ports and effect an engagement of the clutch; and second operating means adapted to move the position of the fulcrum of said lever whereby to effect a movement of the valve piston.

2. Control means according to claim 1, further characterized by the provision of means for holding the piston against such pressure bias until, and for releasing it when, the driven shaft has made a desired number of revolutions.

3. Control means according to claim 1, further characterized by the provision of means operated by the driven-shaft adapted, when such shaft is rotated, to hold the piston against such pressure bias until, and for releasing it when, said carrying shaft has completed a predetermined rotative movement.

4. Control means according to claim 1, further characterized by the provision of a cam operated by the driven shaft and adapted, when the driven shaft is rotated, to engage the first operating means so as to hold the pivoted lever and the valve piston against said pressure bias until, and to release said piston when, the carrying shaft has completed substantially one revolution; and a safety latch interposed between the pivoted lever and the first operating means, with means for releasing such latch and rendering the first-mentioned operating means ineffective after the driven shaft has started to rotate, and for re- engaging it only when the latter mentioned shaft has completed substantially one revolution.

5. Control means according to claim 1, further characterized by the provision of a cam operated by the driven shaft and adapted, when that shaft is rotated, to engage the first mentioned operating means and thereby hold the valve piston against its pressure bias until, and to release said piston when, the driven shaft has completed substantially one revolution; a safety latch interposed between the first operating means and the pivoted lever, another cam operated by the driven shaft, and means operatively engaging said other cam for releasing said latch after the driven shaft has started to rotate and for reengaging the latch when such shaft has completed substantially one revolution.

6. Control means for a power driven machine having a driving shaft, a driven shaft, a clutch for transmitting power between such shafts and normally biased to a released position, and fluid pressure actuated means for engaging said clutch against such bias; a valve for regulating the flow of fluid to such actuating means comprising a casing having inlet, supply, and discharge ports connecting respectively with a source of fluid under pressure, the clutch-actuating means, and an exhaust, and a piston slidably mounted in said casing and adapted to be moved to such positions as to connect the supply ports either with said inlet or discharge ones; and a passage leading from the inlet ports to a chamber formed between an end wall of the casing and an adjacent head of the piston whereby to subject the latter to an unbalanced pressure and normally bias it in a position connecting the supply and discharge ports so as to relieve the pressure on the clutch-actuating means; a valve operating lever having pivotal connection at one of its ends with a stationary part of the machine and pivotal connection between its ends with the piston; first valve operating means including a manually operable lever having pivotal connection with the free end of the pivoted lever; means operated by the driven shaft for engaging a part of the first valve operating means to hold the piston against such bias after the driven shaft has started to rotate and to release the lever and piston after the shaft has completed substantially one revolution; and an emergency operating lever having connection with the pivoted lever which normally constitutes the pivot thereof, whereby such pivoted lever may be released at any time to release the valve piston.

7. Control means for a power driven machine having a driving shaft, a driven shaft, a clutch for transmitting power between such shafts, said clutch being normally biased in its released position, and power actuated mechanism for engaging the clutch against such bias, said control means comprising, in combination: means for governing the flow of power to the clutch actuating mechanism having off-power and on-power positions, and means biasing said governing means to its off-power position; first operating means adapted to move the governing means against its bias to its on-power position; means actuated by the driven shaft of the machine for holding said governing means in its on-power position and for releasing it only after such shaft has completed a desired movement; and second operating means adapted to move said governing means to its off-power position at any time.

8. Control means for a power driven machine having a driving shaft, a driven shaft, a clutch for transmitting power between such shafts, and fluid pressure actuated means for engaging and releasing the clutch, said control means comprising; in combination, a valve having a casing with inlet, supply and discharge ports connecting respectively with a source of fluid under pressure, the clutch actuating means and an exhaust, and a relatively movable valve plug for selectively connecting the supply with either the inlet or the discharge ports to control the flow of fluid to and from the clutch actuating means; a lever having pivotal connection with said valve plug; first operating means connected with said lever for moving said valve plug whereby to actuate the clutch; and second operating means connected with said lever for moving said valve plug whereby to actuate the clutch independently of said first mentioned means.

9. Control means for a power driven machine having a driving shaft, a driven shaft, a clutch for transmitting power between such shafts, said clutch being normally biased in its released position, and fluid pressure actuated means for engaging said clutch, said control means comprising, in combination; a valve having a casing with inlet, supply and discharge ports connecting respectively with a source of fluid under pressure, the clutch actuating means and an exhaust, a relatively movable valve plug for selectively connecting the supply with either the inlet or discharge ports, and means biasing said plug to such position as to connect the supply and discharge ports whereby to relieve the clutch actuating means and permit the clutch to remain in its normally released position; a valve operating lever having a fulcrum and pivotal connection with said valve plug; normal operating means having connection with said lever for moving it about its fulcrum to move said valve plug whereby to effect an actuation of the clutch; and other operating means adapted to shift the position of the fulcrum of the lever to move said valve plug and effect an actuation of the clutch independently of said normal operating means.

10. Control means according to claim 9, further characterized by the provision of means having connection with said valve operating lever and operated by the driven shaft, said means being adapted, after said driven shaft has started rotating, to hold said lever in the position established by movement of the normal operating means against the bias of the valve plug and to release said lever after the driven shaft has completed a predetermined rotative movement.

11. Control means according to claim 9, further characterized in that the normal operating means includes a manually operable lever, means operative responsive to rotation of the driven shaft for holding said valve operating lever in the position established by movement of said manually operated lever and to release it when said driven shaft has substantially completed a desired rotative movement, a safety latch between the valve operating lever and the manually operated one, and means for releasing said latch after the driven shaft has started to rotate and for reengaging such latch when the driven shaft has substantially the desired rotative movement.

12. Control means according to claim 9, further characterized in that the normal operating means includes a manually operable lever, a cam operated by the driven shaft and having connection with the valve operating lever, said cam being adapted, after the driven shaft has started to rotate, to hold said valve operating lever in the position established by movement of said manually operable lever and to release it when said cam has substantially completed one revolution, a safety latch between said valve operating lever and the manually operable one, a second cam operated by the driven shaft, said second cam being adapted to effect a release of said latch after the driven shaft has started to rotate and to effect reengagement of the latch when the cam has completed substantially one revolution.

13. Control means according to claim 8, further characterized in that the clutch is normally biased in its released position, and is engaged by the admission of fluid under pressure to its actuating mechanism; and in that the valve plug is normally biased to such position as to connect the supply ports with the discharge ports of the casing whereby to relieve fluid from the clutch-actuating means.

ROBERT W. STROUT.

CERTIFICATE OF CORRECTION.

Patent No. 2,204,710.                  June 18, 1940.

ROBERT W. STROUT.

It is hereby certified that error appears in the printed specification of the above numbered patent requiring correction as follows: Page 2, second column, line 26, for the word "ports" read --parts--; page 3, second column, line 12, for "foint" read --point--; page 5, first column, line 24-25, claim 3, for "carrying" read --driven--; and that the said Letters Patent should be read with this correction therein that the same may conform to the record of the case in the Patent Office.

Signed and sealed this 30th day of July, A. D. 1940.

Henry Van Arsdale,
Acting Commissioner of Patents.

(Seal)